United States Patent [19]

Musha et al.

[11] 4,318,101

[45] Mar. 2, 1982

[54] MTI RADAR COMPRISING A PROCESSOR SELECTIVELY OPERABLE AS A WEIBULL AND A RAYLEIGH CLUTTER SUPPRESSOR

[75] Inventors: Toshimitsu Musha; Matsuo Sekine; Eichi Kiuchi; Takeru Irabu, all of Tokyo, Japan

[73] Assignee: Nippon Electric Co., Ltd., Tokyo, Japan

[21] Appl. No.: 129,457

[22] Filed: Mar. 11, 1980

[30] Foreign Application Priority Data

Mar. 14, 1979 [JP] Japan .................................. 54-29686

[51] Int. Cl.³ ............................................ G01S 13/52
[52] U.S. Cl. .................................. 343/5 CF; 343/7.7
[58] Field of Search .............................. 343/5 CF, 7.7

[56] References Cited

PUBLICATIONS

"Constant False Alarm Rate Processing in Search Radars" by V. Greger Hansen, reported at International Conference on Radars–Present and Future, Oct. 23-25, 1973, pp. 1-8.
"Method of CFAR Processing Radar Clutter Following Weibull Distribution by Conversion into Rayleigh Distribution" by Sekine et al, Papers for the Reports of General Meeting for 1979 IEEE Communication Engineers of Japan, Fascicle 6, Published 3/5/79, Available only in Japanese, the identification given is a translation.
"Suppression of Weibull-Distributed Clutters Using a Cell-Averaging by LOG/CFAR Receiver" by Sekine, et al, IEEE Transactions on Aerospace and Electronic Systems, vol. AES-14, No. 5, 9/78, pp. 823-826.
"False Alarm Regulation in Log-Normal and Weibull Clutter" by G. B. Goldstein, IEEE Transactions on Aerospace and Electronic Systems, vol. AES-9, No. 1, Jan. 1973.
"Radar Detection in Weibull Clutter" by D. C. Schleher, IEEE Transactions on Aerospace and Electronic Systems, vol. AES-12, No. 6, Nov. 1976.

*Primary Examiner*—Malcolm F. Hubler
*Attorney, Agent, or Firm*—Sughrue, Mion, Zinn, Macpeak & Seas

[57] ABSTRACT

In an MTI radar receiver, a clutter suppressor (46, 47, 48) is switched (72), under the control of a discriminating device (71) responsive either to the shape parameter $\eta$ of the Weibull distribution or an average level of a clutter suppressed signal, to be selectively operable as a Weibull and a Rayleigh clutter suppressor for best possible LOG/CFAR processing with simple cell averaging circuitry. The suppressor may comprise a first processor (61) combined with an $\eta$ parameter calculator (48) for converting the Weibull clutter to the Rayleigh clutter, a second processor (89) for timing, and a simple suppressor (62) for the Rayleigh clutter. (FIG. 6).

11 Claims, 7 Drawing Figures

MTI RADAR COMPRISING A PROCESSOR SELECTIVELY OPERABLE AS A WEIBULL AND A RAYLEIGH CLUTTER SUPPRESSOR

BACKGROUND OF THE INVENTION

This invention relates to an MTI (moving target indication) radar for use in combination with an antenna device at least in detecting a moving target in the presence of Weibull clutter that is known in the art and will later be discussed to some extent. Although not restricted, a radar according to this invention is suited to an air traffic control radar, such as an ASR (airport surveillance radar).

As will later be described in detail with reference to one of several figures of the accompanying drawing, a general radar system that may be an ASR system comprising an antenna, comprises a transmitter for generating a succession of microwave pulses in order to make an antenna radiate the microwave pulses as a sharp directive beam into a space. The antenna is either mechanically or electrically controlled to make the beam repeatedly scan a predetermined solid angle of the space, such as the whole azimuth with a variable elevation angle, along a plurality of unit azimuth regions. The space scanned by the beam will often be called a predetermined space and may be a two-dimensional space with the antenna made to radiate the beam at a predetermined elevation angle.

When an object is present in the scanned space, an echo returns as a return pulse in response to each of a certain number of the radiated microwave pulses either to the antenna or to another similarly controlled antenna for use in receiving such a return signal from each unit azimuth region. In order to facilitate detection of a target, namely, an object to be detected, a receiver output signal produced by a receiver of the radar system is usually used to produce a visual display in which the target is included. The display is used in deciding, with reference to the control of the antenna or antennae, the azimuth of the target or the longitude thereof, as called in terms of spherical polar coordinates, and the elevation angle of the target or the colatitude thereof. In general, the receiver output signal is used also for calculation or measurement of the range or distance of the target from the antenna or antennae with reference to that one of the radiated microwave pulses from which the return pulse is produced. It is possible to use the display in estimating the range.

In practice, it is not seldom that at least one spurious object is present in the scanned space regardless of presence and absence of the target. Besides a target return or echo, namely, the return pulse from the target, such spurious objects produce spurious returns, which result in clutter in the visual display. Although the spurious objects are often referred to as clutter, the word "clutter" will be used in the instant specification primarily to mean the spurious returns irrespective of utilization or not of a visual display. As the case may be, signals produced in the receiver from the target return and the clutter will be called a target return and clutter, respectively.

Examples of the clutter for an MTI radar are land or ground clutter resulting from buildings and undulating terrains, sea clutter arising from sea surface, weather clutter originating with rainfall and rain clouds, and angel echoes attributed to other foreign matters, such as large flocks of migratory birds and/or atmospheric discontinuity or hererogeneity. The difference between the target return and the clutter depends on the field of use of the radar. For instance, the weather clutter becomes the target returns for a weather or meteorological radar. The following description will therefore be limited to MTI radars.

For an MTI radar, it is desirable that the receiver may respond to a moving target with an excellent S/C (signal or target return to clutter) ratio. In other words, the clutter should be suppressed in the receiver output signal to a level of the order of the noise inherent to the receiver. A known MTI (here, a moving target indicator) or MTI canceller is well adapted to discrimination of the moving target from the land clutter but is ineffective in rejecting the clutter caused by spurious objects having velocity components as, for example, the sea clutter, the weather clutter, and the angel echoes. Various proposals have therefore been made to raise the S/C ratio as will presently be described.

By the way, the return signal has an amplitude that varies with time due to target returns and clutter. Furthermore, the clutter is also variable with time. It was formerly believed that the amplitude variation resulting from the clutter follows Rayleigh distribution, which will shortly be described. Later, most of the clutter was found to follow Weibull distribution.

By the use of a variate x representative of the clutter amplitude, which is either zero or positive, the Weibull distribution is expressed by a probability density function $(P_W(x))$ as:

$$P_W(x) = (\eta/\sigma) \cdot (x/\sigma)^{\eta-1} \cdot \exp[-(x/\sigma)^\eta], \quad (1)$$

wherein $\sigma$ and $\eta$ (sometimes denoted by $\gamma$) represent a first or scale and a second or shape parameter, respectively. These parameters have values dependent of the clutter amplitude variation. The Rayleigh distribution is given by another probability density function $P_R(x)$ as:

$$P_R(x) = (2x/\sigma^2) \cdot \exp[-(x/\sigma)^2], \quad (2)$$

by the use of the first parameter of the Weibull distribution probability density function $(P_W(x))$ alone. The Rayleigh distribution is therefore the Weibull distribution of a special case where the second parameter behaves as an invariant having a specific value equal to two.

The clutter having an amplitude that follows the Weibull distribution is named Weibull clutter. The clutter having an amplitude that is given by the Rayleigh distribution is called Rayleigh clutter. General guidelines about the Weibull clutter were discussed in detail by D. Curtis Schleher in his article contributed to IEEE Transactions on Aerospace and Electronic Systems, Vol. AES-12, No. 6 (November 1976), pages 736-743, and titled "Radar Detection in Weibull Clutter."

Amongst the proposals for raising the S/C ratio, CFAR (constant false alarm rate) techniques are most promising. The CFAR techniques are for attaining a constant false alarm rate or probability even in the presence of the clutter. Stated otherwise, the CFAR techniques are to render that false alarm rate constant which represents the probability that the clutter is erroneoulsy detected as a target return.

CFAR processors or detectors for the Rayleigh clutter were reviewed in detail by Vilhelm Gregers Hansen and Harold R. Ward in an article they contributed to IEEE Transactions on Aerospace and Electronic Systems, Vol. AES-8, No. 5 (September 1972), pages 648–652, under the title of "Detection Performance of the Cell Averaging LOG/CFAR Receiver." The term "LOG/CFAR receiver" stands for a logarithmic amplification and CFAR processing receiver. A sophisticated cell averaging LOG/CFAR processor for the Rayleigh clutter of the type reviewed in the Hansen et al article is used in each of MTI radars according to the present invention and will therefore be described later in conjunction with another of the accompanying drawing figures.

A CFAR processor for the Weibull clutter was proposed by Gene B. Goldstein in his article that appeared in IEEE Transactions on Aerospace and Electronic Systems, Vol. AES-9, No. 1 (January 1973), pages 84–92, and was titled "False-Alarm Regulation in Log-Normal and Weibull Clutter." Insofar as the Weibull clutter is concerned, the Goldstein processor is operable only in a specific case for which the parameters for the Weibull distribution are invariants of particular values.

Hansen solely proposed another CFAR processor for the Weibull clutter in general in his report that was made public at International Conference on Radar-Present and Future, 23–25 October 1973. The report of Hansen is paged 1–8 and titled "Constant False Alarm Rate Processing in Search Radars." A processor according to the Hansen report is used in an MTI radar according to an aspect of the instant invention. The processor will therefore be described later with reference to still another of the accompanying drawing figures. Briefly speaking, the Hansen processor carries out suppression of the clutter by converting a variate representative of the clutter amplitude given by the Weibull distribution to a new variate z indicative of the clutter amplitude that follows a simple exponential distribution probability density function $P_E(z)$ given by:

$$P_E(z) = \exp(-z). \tag{3}$$

At any rate, an excellent S/C ratio is achieved by a CFAR processor of the type reported by Hansen. Inasmuch as the Rayleigh clutter is the Weibull clutter of a special case, the processor involves no problem in theory in treating the Rayleigh clutter as the Weibull clutter. The processor is, however, disadvantageous in practice when the clutter merely follows the Rayleigh distribution. This is because the processor must carry out more processes than a sophisticated cell averaging LOG/CFAR processor for the Rayleigh clutter alone. As a result, not only complicated hardware is indispensable but also an increase in error is inevitable to make a clutter residue appear in the receiver output signal when the clutter amplitude is given by the mere Rayleigh distribution.

SUMMARY OF THE INVENTION

It is therefore a general object of the present invention to provide an MTI radar comprising a receiver in which a signal processor is capable of sufficiently suppressing the Weibull clutter in general.

It is a specific object of this invention to provide an MTI radar of the type described, in which the signal processor is capable of excellently suppressing the Rayleigh clutter as well as the Weibull clutter, both to a best possible degree.

It is another specific object of this invention to provide an MTI radar of the type described, wherein the signal processor is operable for the Rayleigh clutter as a suppressor that is simple in structure and works with less steps and errors as compared with a conventional suppressor for the Weibull clutter in general.

A moving target indication radar to which this invention is applicable is for use at least in detecting a moving target that is present in a predetermined space together with spurious objects. The radar comprises a transmitter and a receiver for use in combination with an antenna device. The transmitter is for generating a sequence of microwave pulses of a predetermined pulse width and a predetermined repetition frequency. The antenna device is for making a beam of the microwave pulses scan the predetermined space along a plurality of unit azimuth regions and for receiving a return signal from each unit azimuth region. The return signal is capable of comprising a target return and clutter produced by the target and the spurious objects in response to one of the microwave pulses of the beam, respectively. The clutter has a clutter amplitude that follows one of Weibull and Rayleigh distributions at a time. The Weibull distribution is given by a probability density function of the clutter amplitude by the use of a first and a second parameter having values variable with time. The Rayleigh distribution is given by another probability density function of the clutter amplitude by the use of the first parameter alone with the second parameter given an invariant value equal to two. The receiver comprises means responsive to the return signal for producing a detected signal and a signal processor for processing the detected signal into a processed signal for use at least in detecting the target. The detected signal has an envelope, an envelope amplitude of which is variable with time in response to a target return component and a clutter component introduced into the envelope amplitude from the target return and the clutter, respectively.

According to this invention, the signal processor specified in the next preceding paragraph comprises parameter calculating means, first and second suppressing means, discriminating means, selecting means, a connection, and final processing means. The parameter calculating means is responsive to the detected signal for calculating the value of the second parameter to produce a parameter signal representative of the calculated second parameter value. Operatively coupled to the parameter calculating means, the first suppressing means is responsive to the detected signal for suppressing that first-kind component of the clutter component by the use of the parameter signal, which is introduced into the envelope amplitude from the clutter having a clutter amplitude following the Weibull distribution, to produce a first clutter suppressed signal having an amplitude that is kept below a first predetermined level unless at least one of the target return component and that second-kind component of the clutter component, which is introduced into the envelope amplitude from the clutter having a clutter amplitude following the Rayleigh distribution, is present in the envelope amplitude. Operatively coupled to the first suppressing means, the second suppressing means is responsive to the detected signal for suppressing the second-kind component to produce a second clutter suppressed signal having an amplitude that is kept below a second predetermined level unless at least one of the target return component and the first-kind component is present in the envelope amplitude. The discriminating means is responsive to a variable input signal variable in compliance with that one of the Weibull and the Rayleigh distributions, which the clutter amplitude follows at each instant, for discriminating the above-mentioned one distribution from the other to produce a discrimination signal at a particular instant a predetermined interval of time after the afore-said each instant. The discrimination signal is indicative of the Weibull and the Rayleigh distributions when the Weibull and the Rayleigh distributions are discriminated to be followed by the clutter amplitude, respectively. Coupled to the first and the second suppressing means, the selecting means is responsive to the discrimination signal for selecting the first and the second clutter suppressed signals when the discrimination signal indicates the Weibull and the Rayleigh distributions, respectively. The selecting means thereby produces a selected signal having an amplitude that is kept below a first preselected level when the first clutter suppressed signal is selected and furthermore unless at least one of the target return component and the second-kind component is present in the envelope amplitude and below a second preselected level when the second clutter suppressed signal is selected and furthermore unless at least one of the target return component and the first-kind component is present in the envelope amplitude. The connection is comprised between the discriminating means and a predetermined one of the parameter calculating means and the selecting means for supplying the discriminating means with one of the parameter signal and the selected signal as the variable input signal that is produced by the predetermined one of the parameter calculating means and the selecting means. The final processing means is responsive to the discrimination signal for processing the selected signal into the processed signal.

The predetermined space may be variable when the radar accompanied by the antenna device is used to track a specific moving target. The expression "microwave pulses" is used to mean pulses of any frequency in a range in which an MTI radar is operable. Preferably, the microwave pulses are radiated from the antenna device cyclically into the respective unit azimuth regions. The antenna device may comprise either only one antenna for both transmission and reception or antennae separately for transmission and reception. The processed signal becomes a receiver output signal that has an amplitude variable in response to the target return substantially alone with the clutter rejected.

The selecting means may either be connected as a whole to outputs of the first and the second suppressing means or partly placed in the first and the second suppressing means with the remaining part connected to the outputs of the suppressing means. According to an aspect of this invention, the first suppressing means comprises a novel processor by which the variate representative of the clutter amplitude given by the Weibull distribution is once converted according to a novel algorithm to a novel variate representative of a clutter amplitude that follows the Rayleigh distribution rather than the simple exponential distribution mentioned hereinabove.

DESCRIPTION OF THE PREFERRED EMBODIMENTS

Figure 1:
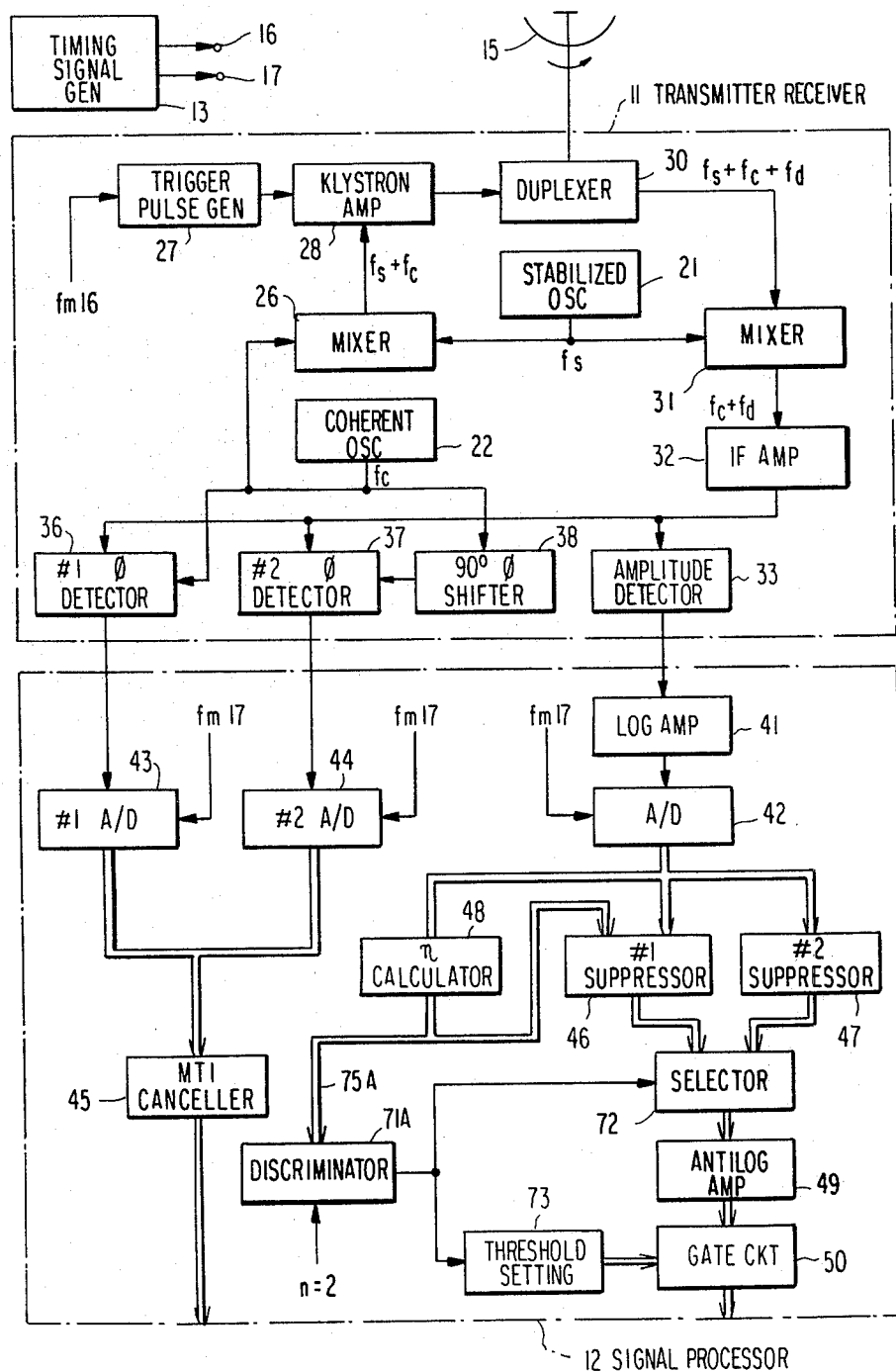
FIG. 1 is a block diagram of an MTI radar according to a first embodiment of the instant invention, shown together with an antenna.

Referring to FIG. 1, an MTI radar according to a first embodiment of the present invention will be described as applied to an ASR. The radar comprises a transmitter-receiver 11, a CFAR or signal processor 12, and a timing signal generator 13 and is accompanied by an antenna 15. The transmitter-receiver 11, the timing signal generator 13, and the antenna 15 are of the known structure. The timing signal generator 13 is for supplying first and second timing signal generator output terminals 16 and 17 with a first timing signal of a lower rate or repetition frequency of, for example, 1 kHz and a second timing signal of a higher rate, such as 1.3 MHz, respectively. The signal processor 12 is partly novel and partly similar in structure to a conventional CFAR processor disclosed in the above-referenced Hansen report and to a sophisticated cell averaging LOG/CFAR processor of the type discussed in the above-cited Hansen et al article. Alternatively, the CFAR processor according to the Hansen report may be changed to a novel processor designed to operate in compliance with a novel algorithm.

The transmitter-receiver 11 comprises a transmitter, a receiver, and circuit elements shared by the transmitter and the receiver. Among the common circuit elements, a frequency stabilized oscillator 21 is for generating an oscillating signal at a signal frequency $f_s$ in the microwave band. A coherent oscillator 22 is for generating a phase reference signal of a reference frequency $f_c$ in an intermediate frequency band. The transmitter comprises a transmitter mixer 26 for mixing the oscillating and the phase reference signals to produce a mixed signal of a microwave frequency $f_2 + f_c$. Responsive to the first timing signal, a trigger pulse generator 27 produces a train of trigger pulses of a predetermined pulse width at the lower rate. Pulse modulated by the trigger pulse train, a high-power amplifier 28, such as a klystron amplifier, amplifies the mixed signal to feed the antenna 15 with a sequence of microwave pulses of the microwave frequency $f_s + f_c$ and of the predetermined pulse width through a duplexer 30 that is shared in common by the transmitter and the receiver. The pulse width is determined in cosideration of the higher rate. For the rate of 1.3 MHz, the pulse width is preferably about 0.8 microsecond.

The antenna 15 radiates the microwave pulses in a sharp directive beam and is controlled as symbolized by an arcuate line with an arrowhead to make the beam scan the whole azimuth at a predetermined elevation angle. Return pulses from a moving target and spurious objects in the scanned space are received by the antenna 15. As a result of the Doppler effect, the frequency of the target return includes a Doppler shift $f_d$, which may be plus, minus, or zero.

As will later be described, a return signal that is received by the antenna 15 and may or may not include the target return in addition to the clutter, is sampled in the receiver at the higher rate into analog radar data samples. It is usual for the ASR that the beam is rotated at a period of rotation of four seconds. The scanned space is therefore divided into four thousand unit azimuth regions, into which the respective microwave pulses are cyclically sent. Inasmuch as an interval of one millisecond of the successive microwave pulses is sampled at the higher rate of 1.3 MHz, each unit azimuth region is divided into about 769 unit range regions from which the respective samples are obtained. Each unit range region is equal to the width of radiated microwave pulses in air or about one sixteenth nautical mile. The total 769 unit range regions is about 48 nautical miles long. In practice, some successive ones of the samples, such as those obtained from the farthest unit range regions, are not used so that an interval of time may be interposed between those two successions of the samples which are obtained from two adjacent unit azimuth regions. At any rate, the antenna 15 produces a return signal from each unit azimuth region, which signal may comprise a target return and clutter.

The receiver comprises a receiver mixer 31 supplied with the oscillating signal for converting the return signal to an intermediate frequency signal. The target return contained in the intermediate frequency signal has an intermediate frequency $f_c + f_d$ variable with the Doppler shift $f_d$. After amplified by an intermediate frequency amplifier 32, the intermediate frequency signal is amplitude detected by an amplitude detector 33. The detected signal has an envelope having an envelope amplitude X variable with time in response to a target return component and a clutter component introduced into the envelope amplitude from the target return and the clutter included in the return signal, respectively. Let the clutter component have an amplitude that is designated again by x merely for simplicity of denotation. The clutter component amplitude x is given by either of Equations (1) and (2).

In the receiver, first and second phase detectors 36 and 37 are supplied with the phase reference signal directly and through a 90° phase shifter 38, respectively, and carry out phase detection of the amplified intermediate frequency signal. The phase detectors 36 and 37 produce a pair of phase detected signals representative of information concerning the Doppler shift $f_d$.

The signal processor 12 is for processing the amplitude detected signal into at least one processed signal for use at least in detecting the target. The signal processor 12 comprises a logarithmic converter or amplifier 41 for subjecting the envelope amplitude X to logarithmic conversion to produce a logarithmic converter output signal. The clutter component amplitude x is converted to a logarithmic clutter component amplitude w according to:

$$w = \log x,$$

where (log x) represents preferably the natural logarithm of the clutter component amplitude x. Responsive to the second timing signal, a single analog-to-digital converter 42 samples the logarithmic converter output signal into a sequence of analog data samples having discrete analog amplitudes and produces a sequence of digital or digitized signals indicative of logarithms of digitized discrete amplitudes of the detected signal envelope. Each digital signal may be of ten bits. In general, the digital signals comprise a logarithmic target return component and logarithmic clutter components. The logarithms indicated by the logarithmic clutter components will be denoted by w(n), where n represents numbers given to the respective unit range regions in each unit azimuth region. The logarithmic clutter components will be designated also by w(n) merely for convenience of denotation.

The signal processor 12 further comprises first and second analog-to-digital converters 43 and 44 for converting the phase detected signals to digitial signal pairs. Supplied with the digital signal pairs, a known MTI canceller 45 produces an MTI canceller output signal in which the clutter resulting from standstill objects are cancelled. The MTI canceller output signal serves as a processor output signal for use in dealing with the Doppler shift $f_d$ as, for example, for use in discriminating between the moving targets.

The digital signal sequence is supplied to first or Weibull clutter and second or Rayleigh clutter suppressors 46 and 47 and also to a parameter calculator 48. The signal processor 12 still further comprises an antilogarithmic converter or amplifier 49 and a gate circuit 50. In the manner to be described in the following, the first and the second suppressors 46 and 47 produce a first and a second clutter suppressed signal, respectively. The antilogarithmic converter 49 is for producing an antilogarithmic converter output signal by subjecting either of the first and the second clutter suppressed signals that is supplied thereto at a time, to antilogarithmic conversion that is conjugate with the logarithmic conversion. The gate circuit 50 is for producing a processed signal by rejecting those portions of the antilogarithmic converter output signal which result from the clutter component.

A combination of the second suppressor 47, the logarithmic and the antilogarithmic converters 41 and 49, and the gate circuit 50 may be a sophisticated cell averaging LOG/CFAR processor of the type discussed in the above-referenced Hansen et al article and suppresses the Rayleigh clutter. Another combination of the first suppressor 46, the parameter calculator 48, the converters 41 and 49, and the gate circuit 50 may be a CFAR processor revealed in the above-cited Hansen report. Alternatively, the first suppressor 46 may work in accordance with a novel algorithm to once convert the Weibull clutter to the Rayleigh clutter in cooperation with the parameter calculator 48.

Figure 2:
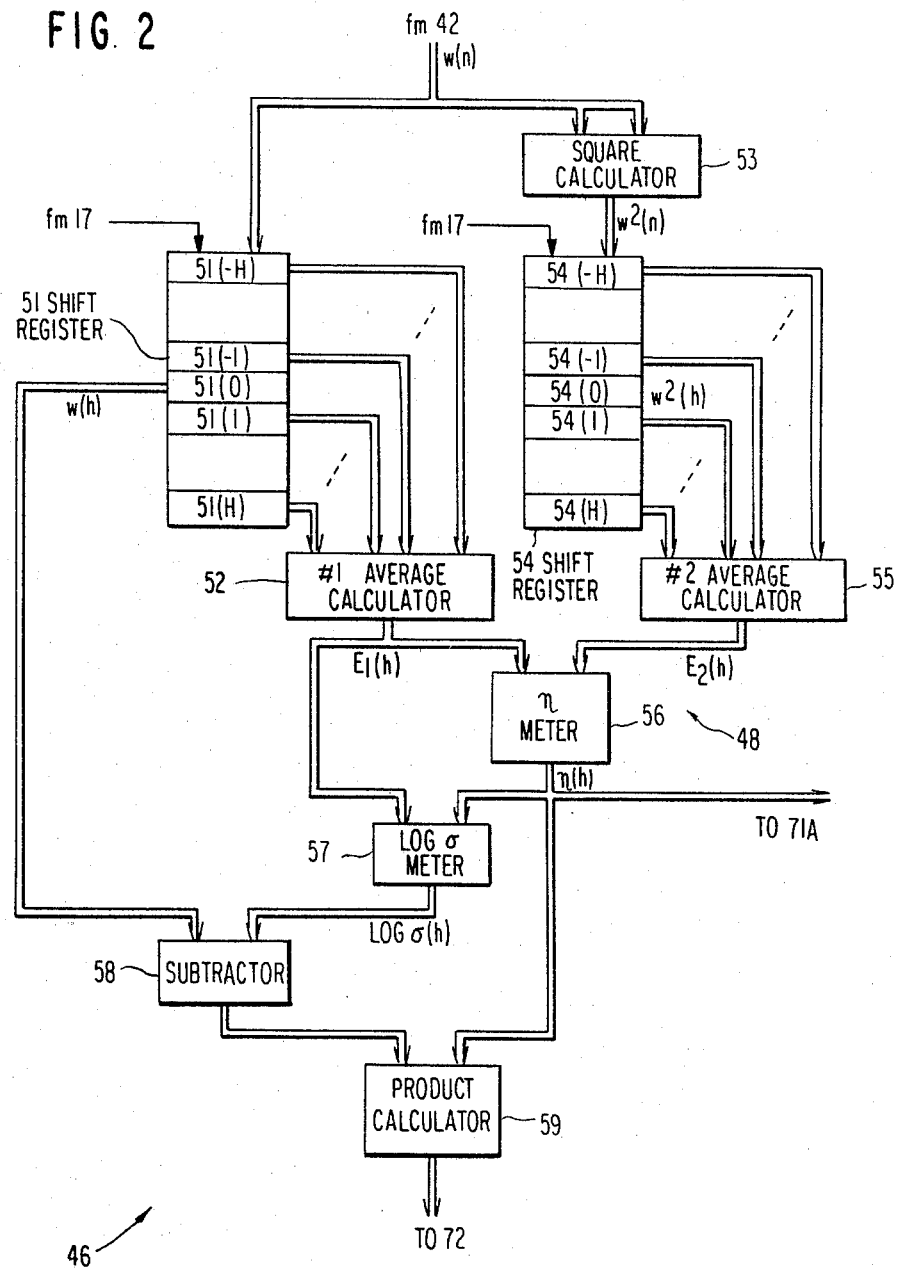
FIG. 2 shows in blocks a clutter suppressor and a parameter calculator for use in a signal processor of the radar illustrated in FIG. 1.

Turning to FIG. 2 for a short while, the first suppressor 46 comprises, as disclosed in the Hansen report, a first shift register 51 that has (−H)-th through minus first stages 51(−H) to 51(−1), a center or zeroth stage 51(0), and first through H-th stages 51(1) to 51(H) and is supplied with the second timing signal as the shift pulses. Each stage, as called herein, is for a digital signal of the digital signal sequence. If no logarithmic target return component is present in successive digital signals, (2H+1) in number, the shift register 51 is loaded with logarithmic clutter components w(h−H), . . . , (w(h−1), w(h), w(h+1), . . . , and w(h+H) at a particular instant at which a particular or h−th logarithmic clutter component w(h) is stored in the center stage 51(0). It is possible to select the number H between twelve and sixteen. A first average calculator 52 is connected to the shift register stages except the center stage 51(0) so as to produce a first average signal $E_1(h)$ representative of a first average $E_1(h)$ given by:

$$E_1(h) = (1/[2H]) \cdot \sum_{n=1}^{H} [w(h - n) + w(h + n)],$$

if no logarithmic target return component is included in the digital signals supplied to the first average calculator 52. The first average is for use as that mean value $E(w)$ of the logarithmic clutter component amplitudes w which is mathematically calculated for the Weibull distribution to be equal to:

$$E(w) = \log \sigma - \gamma/\eta, \quad (4)$$

where $\gamma$ represents the Euler's or Euler-Mascheroni constant.

The reason why a particular or h-th digital signal stored in the center stage 51(0) is excluded from calculation of the first average is already known. Briefly speaking, it is not preliminarily known which one of the digital signals of each sequence would be the logarithmic target return component. The particular digital signal is substantially real-time CFAR processed as will become clear as the description proceeds. The CFAR processing is of particular importance when the particular digital signal is the logarithmic target return component on which a logarithmic clutter component may or may not be superposed. In this event, the first average is calculated only as regards the logarithmic clutter components. This is advantageous in raising the S/C ratio. The reason applies to similar average calculation to be described in the following.

The parameter calculator 48 shown in FIG. 2 comprises a square calculator 53 responsive to the digital signal sequence for producing a sequence of squared signals representative of squares of the respective logarithms indicated by the successive digital signals. In the absence of the logarithmic target return component, both the squared signals and the squares represented thereby may be designated by $w^2(n)$. A second shift register 54 has $(-H)$-th through minus first, zeroth or center, and first through H-th stages $54(-H), \ldots, 54(-1), 54(0), 54(1), \ldots$, and $54(h)$. When the h-th logarithmic clutter component $w(h)$ is stored in the first shift register center stage 51(0), the square of this h-th logarithmic clutter component $w^2(h)$ is stored in the second shift register center stage 54(0). As was the case with the first average calculator 52, a second average calculator 55 produces a second average signal $E_2(h)$ representative of a second average $E_2(h)$ given by:

$$E_2(h) = (1/[2H]) \cdot \sum_{n=1}^{H} [w^2(h - n) + w^2(h + n)],$$

provided that no logarithmic target return component is contained in the squared signals supplied to the second average calculator 55. The second average is for use as that square mean value $E(w^2)$ of the logarithmic clutter component amplitudes w which is known in mathematics as:

$$E(w^2) = \pi^2/(6\eta^2) + (\log \sigma - \gamma/\eta)^2.$$

On the other hand, the variance $V(w)$ of the logarithmic clutter component amplitudes w is given according to mathematics by:

$$V(w) = E(w^2) - [E(w)]^2 = \pi^2/(6\eta^2),$$

which is no more dependent on the first parameter $\sigma$ but only on the second parameter $\eta$. It is now possible to know the value of the second parameter $\eta$ by the use of the first and the second averages $E_1(h)$ and $E_2(h)$. The parameter calculator 48 therefore comprises a parameter meter 56 responsive to the first and the second average signals $E_1(h)$ and $E_2(h)$ for calculating an instantaneous value $\eta(h)$ of the second parameter $\eta$ at the particular instant. The parameter meter 56 produces a parameter signal, denoted also by $\eta(h)$, representative of the second parameter value calculated in compliance with:

$$\eta(h) = \left( \pi/\sqrt{6} \right) / \sqrt{E_2(h) - [E_1(h)]^2} . \quad (5)$$

In FIG. 2, the first suppressor 46 comprises a parameter logarithm meter 57 responsive to the first average signal $E_1(h)$ and the parameter signal $\eta(h)$ for calculating a logarithm $\log\sigma(h)$ of an instantaneous value that the first parameter $\sigma$ has at the particular instant. The parameter logarithm meter 57 produces a parameter logarithm signal, designated by $\log\sigma(h)$, representative of the first parameter logarithm calculated according to:

$$\log \sigma(h) = E_1(h) + \gamma/\eta. \quad (6)$$

Speaking now in general, let the detected signal amplitude X be converted to a new variate Z according to a specific function by which the clutter component amplitude x, dependent on the first and the second parameters, is converted to a new clutter variate z dependent on neither of the two parameters. The new clutter variate z be given by:

$$z = F(x, \sigma, \eta),$$

where $F(x, \sigma, \eta)$ represents the specific function. On the other hand, let a cumulative density function of the Weibull probability density function $P_W(x)$ be denoted by $Q_W(x)$. The cumulative density function $Q_W(x)$ is given by:

$$Q_W(x) = \int_0^x P_W(x)dx = 1 - \exp[-(x/\sigma)^\eta],$$

according to mathematics. It is now understood that the new clutter variate z follows the simple exponential distribution defined by Equation (3) if the cumulative density function $Q_W(x)$ be used as:

$$z = -\log[1 - Q_W(x)] = (x/\sigma)^\eta,$$

in the specific function. A logarithmic clutter variate $(\log z)$ is given by:

$$\log z = \eta(\log x - \log \sigma),$$

which equation means that CFAR processing is feasible when those values of the new variate Z are taken out as the target returns which are greater than a threshold level prescribed relative to the variance of the new clutter variate z that is no more dependent on the parameters $\sigma$ and $\eta$ but only on the circuit constants of the circuits concerned.

Reverting to FIG. 2, the first suppressor 46 comprises a subtractor 58 responsive to the particular digital signal stored in the first shift register center stage 51(0) at the particular instant and to the parameter logarithm signal log $\sigma(h)$ for producing a difference signal representative of a difference resulting from subtraction of the instantaneous first parameter logarithm log $\sigma(h)$ from the logarithm indicated by the particular digital signal. If no logarithmic target return component is present in the particular digital signal, the logarithm is represented by w(h) or [log x(h)]. The difference is given by [log x(h)−log $\sigma(h)$]. Responsive to the parameter signal $\eta(h)$ and the difference signal, a product calculator 59 produces the first clutter suppressed signal that includes at the particular instant a multiplied signal representative of a result of multiplication of the calculated second parameter value $\eta(h)$ and the difference. Such results of multiplication are representative of logarithmic clutter variate [log z(h)] given by:

$$\log z(h) = \eta(h) \cdot [\log x(h) - \log \sigma(h)],$$

in the absence of the logarithmic target return component. The first clutter suppressed signal has discrete amplitudes that are equal to the logarithms of the successive values of the new variate Z and are kept below a first predetermined level dependent only on the circuit constants unless at least one of the target return component and the clutter component resulting from the Rayleigh clutter is present in the detected signal.

Before describing the remaining parts of the signal processor 12, the novel algorithm mentioned hereinabove will be described. Once converted to the Rayleigh clutter according to the novel algorithm, the Weibull clutter is CFAR processed by a sophisticated cell averaging LOG/CFAR processor.

Let the variate x that follows the Weibull probability density function $P_W(x)$ be converted to a novel variate y in accordance with:

$$y = \sigma \cdot (x/\sigma)^{\eta/2}. \quad (7)$$

A novel probability density function, designated by $P_N(y)$, of the novel variate y is given by:

$$P_N(y) = P_W(x) dy/dx. \quad (8)$$

By the use of Equations (1) and (7), Equation (8) is rearranged into:

$$P_N(y) = (2/\sigma) \cdot (y/\sigma) \cdot \exp[-(y/\sigma)^2]. \quad (9)$$

Equation (9) is identical with Equation (2). When given by logarithmic expression, Equation (7) turns into:

$$\log y = \log \sigma + (\eta/2) \cdot (\log x - \log \sigma), \quad (10)$$

in which the values of the second parameter $\eta$ and the first parameter logarithm log $\sigma$ are already known from Equations (5) and (6).

Figure 3:
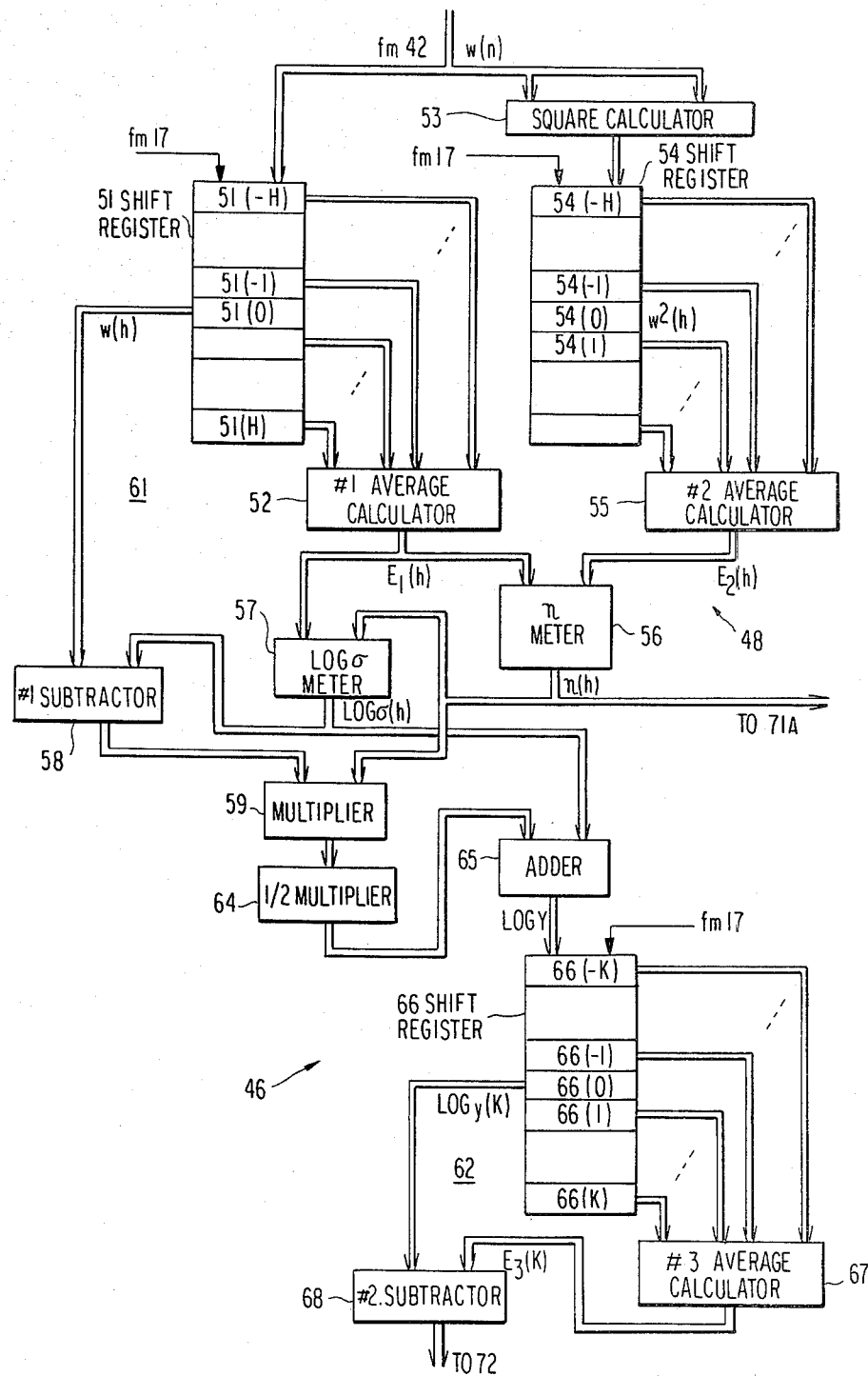
FIG. 3 shows also in blocks a clutter suppressor and a parameter calculator that may be substituted for the circuitry depicted in FIG. 2.

Turning now to FIG. 3, a first suppressor 46 that may be substituted for the first suppressor 46 illustrated with reference to FIG. 2, comprises a novel processor 61 for carrying out the novel algorithm and a simple suppressor 62 for the Rayleigh clutter. A combination of the novel processor 61 and the parameter calculator 48 comprises similar parts designated by like reference numerals as in FIG. 2 and is operable with corresponding signals denoted by like reference symbols. The product calculator 59, however, delivers the signal representative of the result of multiplication to a divider 64 that may be combined with the product calculator 59 into a combined multiplier. The output signal of the multiplier may be named a product signal that now represents a product of the second parameter value $\eta(h)$, $\frac{1}{2}$, and the difference, which difference is equal to the second term in the right side of Equation (10) provided that the logarithmic target return component is absent in the digital signals supplied to the first average calculator 52. Representative to the product signal and the parameter logarithm signal log $\sigma(h)$, an adder 65 produces a digital sum signal indicative of a sum of the first parameter logarithm and the product, which sum is equal to [log y(h)] given according to Equation (10) in the absence of the last-mentioned logarithmic target return component.

The novel processor 61 thus produces a sequence of the digital sum signals, which sequence may be designated by log Y. The digital sum signal sequence has discrete amplitudes equal to the sums indicated by the successive digital sum signals and is herein called a transform signal in which the logarithmic target return component appears as a target return transform with a predetermined delay related to the number of first shift register stages preceding the zeroth stage 51(0). The logarithmic clutter components are transformed into clutter transforms that may be denoted by [log y(m)], where m represents numbers equivalent to the numbers n, and that are what would be introduced into the transform signal through the envelope amplitude from imaginational Rayleigh clutter if the imaginational clutter were substituted for the Weibull clutter.

In FIG. 3, the simple suppressor 62 is a sophisticated cell average subtraction circuit. More particularly, the suppressor 62 comprises a third shift register 66 having (−K)-th through minus first, zeroth or center, and first through K-th stages 66(−K), ..., 66(−1), 66(0), 66(1), ..., and 66(K) for storing the digital sum signals, (2K+1) in number at a time. The number K may be an integer between twelve and sixteen. At a specific instant a preselected interval of time after the particular instant, the zeroth stage 66(0) is loaded with a specific digital sum signal that may be denoted by [log Y(k)] if no target return transform is included therein. As was the case with the first average calculator 52, a third average calculator 67 produces a third average signal $E_3(k)$ representative of a third average $E_3(k)$, which is given by:

$$E_3(k) = (1/[2K]) \cdot \sum_{m=1}^{K} [\log y(k-m) + \log y(k+m)],$$

if no target return transform is included in the digital sum signals supplied to the third average calculator 67. Responsive to the specific digital sum signal and the third average signal $E_3(k)$, a second subtractor 68 produces a second difference signal representative of a second difference obtained by subtracting the third average $E_3(k)$ from the sum indicated by the specific digital sum signal. In the absence of the target return transform in the digital sum signal stored in the third shift register 66, the second difference is given by [log $y(k)-E_3(k)$]. When subjected to the antilogarithmic conversion at the antilogarithmic converter 49, such a second difference signal gives the new clutter variate z according to:

$$z = y(k)/\exp[E_3(k)],$$

which is independent of the two parameters $\sigma$ and $\eta$ originally had by the Weibull clutter and dependent only on the circuit constants of the related circuits. It is therefore possible by the use of the gate circuit 50 to reject the Weibull clutter.

The simple suppressor 62 thus produces a sequence of the second difference signals. The second difference signal sequence serves as the first clutter suppressed signal, which has discrete amplitudes equal to the successive second differences.

The second suppressor 47 depicted in FIG. 1 is similar in structure to the simple suppressor 62. It is only necessary that the logarithmic target return component should appear in the second clutter suppressed signal simultaneously with the appearance thereof as either one of the multiplied signals (FIG. 2) or one of the second difference signals (FIG. 3) in the first clutter suppressed signal. With the Rayleigh clutter suppressed, the second clutter suppressed signal has an amplitude that is kept below a second predetermined level dependent on the circuit constants of the related circuits unless at least one of the target return component and the clutter component is present in the envelope amplitude. The second clutter suppressed signal has discrete amplitudes of the multiplied signals or of the second difference signals.

It may be repeated here that the second clutter suppressed signal is given a somewhat higher level when the digital signals stored in the shift register of the second suppressor 47, include logarithmic clutter components derived from the Weibull clutter. When only the Rayleigh clutter is present, the first clutter suppressed signal is rendered a little higher than the second clutter suppressed signal because of the reason pointed out before. The signal processor 12 therefore comprises a discriminator 71A supplied with a reference signal indicative of two as the second parameter value for discriminating whether or not the instantaneous value $\eta(h)$ of the second parameter is in a predetermined range including a value equal to two. The discriminator 71A may be a read-only memory or a comparator and produces a discrimination signal indicative of the Weibull and the Rayleigh distributions when the instantaneous value is in the predetermined range and outside thereof, respectively. Responsive to the discrimination signal, a selector 72 connected to the first and the second suppressors 46 and 47, selects the first and the second clutter suppressed signals as a selector output signal when the discrimination signal indicates the Weibull and the Rayleigh distributions, respectively.

When the first processor 46 comprises the novel processor 61 and the simple suppressor 62, the target return transform and the clutter transforms appear as the second difference signals in the first clutter suppressed signal with a preselected delay related to the third shift register stages prior to the zeroth stage 66(0) as compared with production of the parameter signal $\eta(h)$ and hence the discrimination signal. It is therefore preferred that the selector 72 be operable with the preselected delay.

In FIG. 1, the selector output signal is supplied to the antilogarithmic converter 49 as the above-mentioned "either" of the first and the second clutter suppressed signals. For convenience of an understanding of the present invention as a whole, the antilogarithmic converter 49 may be considered as an intermediate processor for processing the selector output signal into a selected signal and is a part of a selecting device that comprises the selector 72 as the remaining part. The selecting device is coupled to the first and the second suppressors 46 and 47 and is for selecting the first and the second clutter suppressed signals to produce the selected signal when the discrimination signal indicates the Weibull and the Rayleigh distributions, respectively. The selected signal has discrete amplitudes related to the discrete amplitudes of the selected one of the first and the second clutter suppressed signals. The discrete amplitudes of the selected signal are kept below a first preselected level related to the first predetermined level when the first clutter suppressed signal is selected and furthermore unless at least one of the target return component and the clutter component derived from the Rayleigh clutter is present in the envelope amplitude and below a second preselected level related to the second predetermined level when the second clutter suppressed signal is selected and furthermore unless at least one of the target return component and the clutter component resulting from the Weibull clutter is present in the envelope amplitude.

In the meanwhile, the discrimination signal is supplied to a threshold setting circuit 73 for producing a variable threshold signal having a level variable to either of a first and a second threshold level when the discrimination signal indicates the Weibull and the Rayleigh distributions, respectively. The first and the second threshold levels are related to antilogarithms of the first and the second predetermined levels, respectively, and may be equal thereto. The gate circuit 50 serves as a final processor in combination with the threshold setting circuit 73. Responsive to the threshold signal, the gate circuit 50 produces the processed signal by making those portions of the selected signal, namely, the antilogarithmic converter output signal, pass therethrough which have discrete amplitudes higher than the first and the second threshold levels when the selected signal is produced from the first and the second clutter suppressed signals, respectively. The gate circuit 50 may be a comparator.

Figure 4:
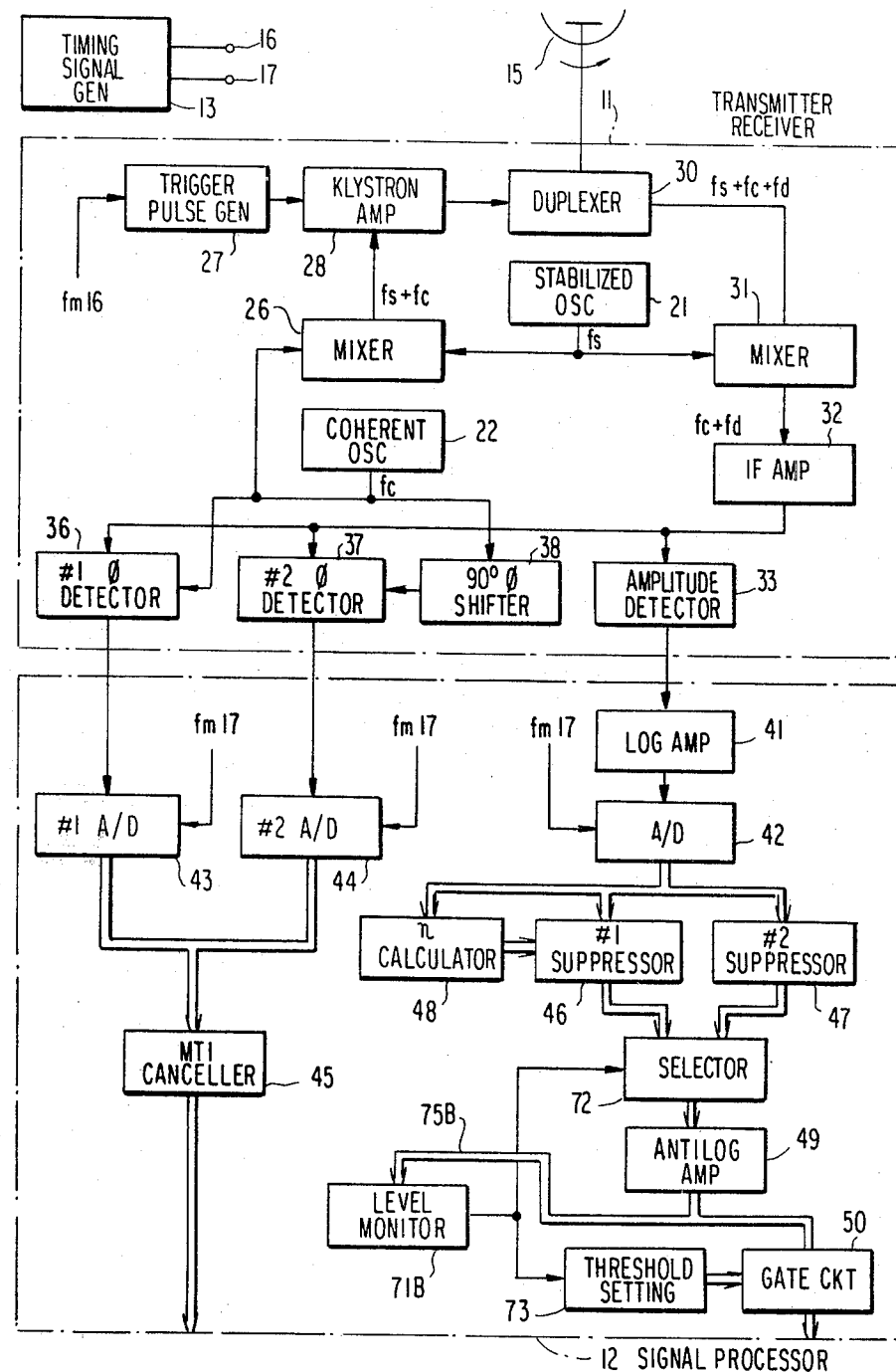
FIG. 4 is a block diagram of an MTI radar according to a second embodiment of this invention, illustrated again together with an antenna.

Referring now to FIG. 4, an MTI radar according to a second embodiment of this invention is accompanied by an antenna 15 and comprises similar parts designated by the like reference numerals is in FIG. 1 except that a level monitor 71B to be presently described in detail is substituted for the discriminator 71A for production of the discrimination signal at a particular instant. Generally speaking, the level monitor 71B serves as a discriminating device and is supplied with a variable input signal variable in compliance with that one of the Weibull and the Rayleigh distributions which the clutter amplitude follows at each instant a predetermined interval of time before the particular instant. In contrast to the circuitry illustrated with reference to FIG. 1 wherein the discriminator 71A is supplied with the parameter signal as the variable input signal through a connection 75A, the level monitor 71B is supplied with the detected signal as the variable input signal through another connection 75B.

Figure 5:
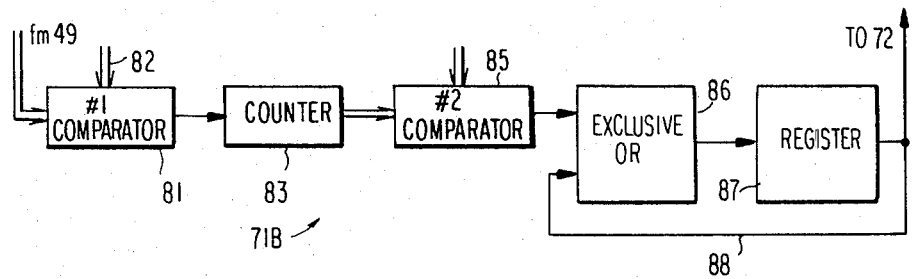
FIG. 5 is a block diagram of a level monitor for use in a signal processor of the radar depicted in FIG. 4.

Turning to FIG. 5, the level monitor 71B may comprise a first comparator 81 supplied with the selected signal that has discrete amplitudes as pointed out heretobefore. The first comparator 81 compares the discrete amplitudes with a prescribed level indicated at 82 and selected in consideration of the receiver noise to produce a sequence of discrete output signals, each of which is given a predetermined one of binary levels, such as a logic "1" level, each time when the discrete amplitude is higher than the prescribed level. A resettable counter 83 is for counting those of the discrete output signals, each of which has the predetermined binary level, to produce a count signal representative of the number of those discrete output signals of the predetermined binary level which are supplied thereto during a prescribed interval of time. A second comparator 84 is for comparing the count represented by the count signal with a prescribed count indicated at 85 to produce a comparator output signal that is given a preselected one of binary values and the other, such as a logic "1" and a logic "0" value, when the count is greater and not greater than the prescribed count, respectively. By the binary values, the comparator output signal indicates whether an average level of the selected signal is increasing or not. The prescribed interval and the prescribed count are selected so that the rise of the average level which result from the target return component may not be discriminated as impertinent clutter suppression.

Further referring to FIG. 5, an Exclusive OR circuit 86 has a first and a second input terminal for receiving the comparator output signal and a reference input signal having either of the binary values at a time, respectively. The Exclusive OR circuit 86 produces an Exclusive OR'ed signal given an output binary value that is the same as the Exclusive OR of the comparator output signal binary value and the reference input signal binary value. A register 87 is for registering the output binary value to produce a register output signal given a registered binary value that is the same as the output binary value registered therein. The register output signal is delivered to the second input terminal of the Exclusive OR circuit 86 as the reference input signal through a connection 88. The registered binary value is therefore inverted and kept unchanged when the comparator output signal has the predetermined binary value and has not, respectively. The register output signal thus provides the discrimination signal. One of the Weibull and the Rayleigh distributions that is indicated by the discrimination signal is changed to the other only when the binary value represented by the discrimination signal are switched from one to the other, namely, either from the logic "1" value to the logic "0" value or from the logic "0" value to the logic "1" value. Otherwise, the indication is kept as it is.

With the level monitor 71B, the selector 72 selects one of the first and the second clutter suppressed signals at least with a delay equal to the prescribed interval. This, however, is not serious.

Figure 6:
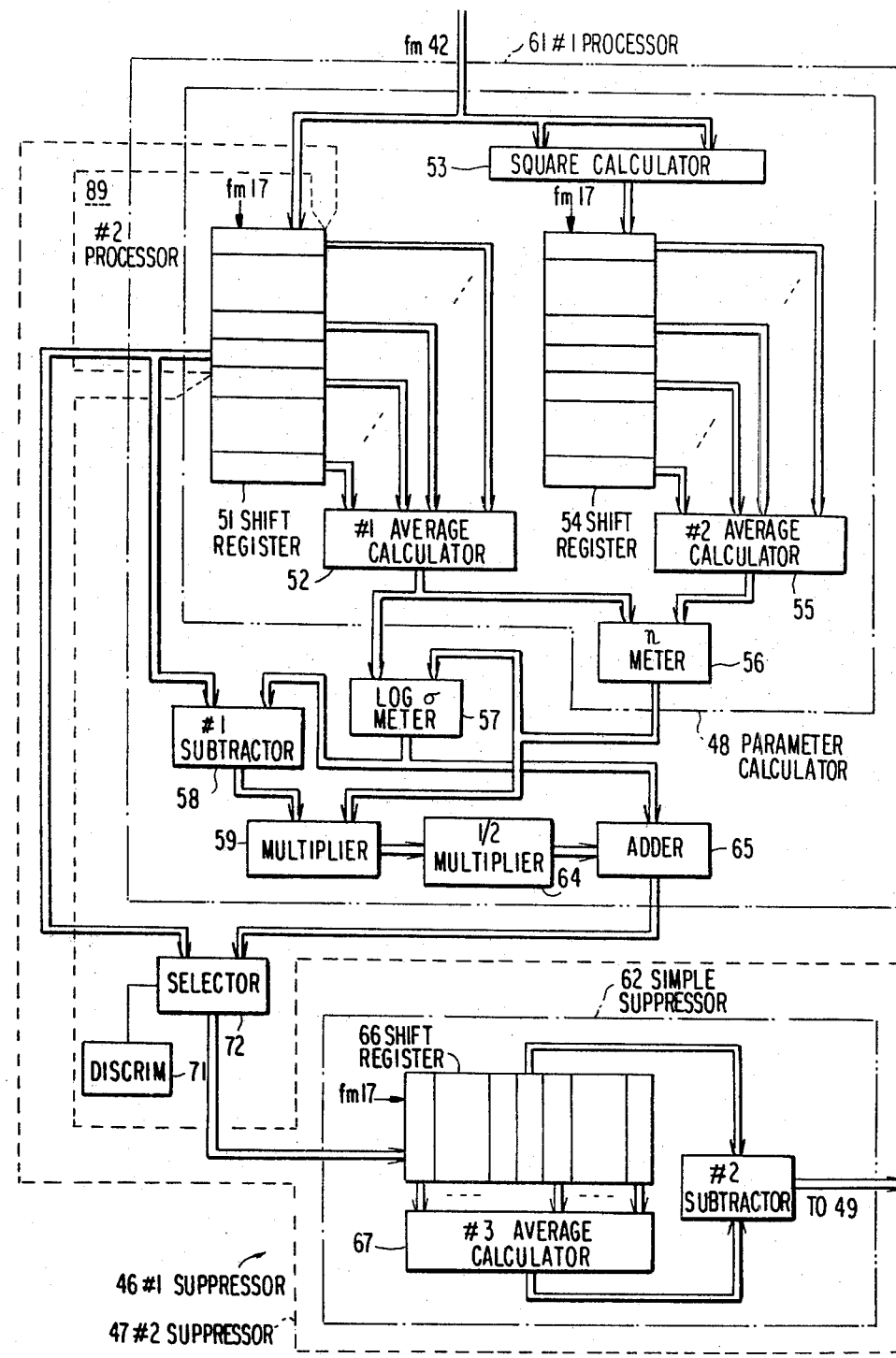
FIG. 6 shows in blocks a pair of clutter suppressors, a parameter calculator, a discriminator, and a selector for use in a signal processor of the radar shown in either of FIGS. 1 and 4.

Turning now to FIG. 6, a combination of first and second suppressors 46 and 47, a parameter calculator 48, and a selector 72 comprises similar parts designated by like reference numerals as in FIG. 3. A discriminating device 71 may be whichever of the discriminator 71A and the level monitor 71B. Connected to the first processor 61 that is described hereinabove as a novel processor in conjunction with FIG. 3, the selector 72 selects the transform signal and delivers the same as a selector output signal to the simple suppressor 62 when the discrimination signal indicates the Weibull distribution. The suppressor 62 produces the first clutter suppressed signal. The second suppressor 47 shares a portion of the first shift register 51 with the novel processor 61 of the first suppressor 46. The first shift register portion serves as a second processor 89, which is merely for giving the predetermined delay to the digital signal sequence to produce a delayed signal comprising a target return delayed component and clutter delayed components into which the logarithmic target return component and the logarithmic clutter components are delayed, respectively. Coupled also to the second processor 89, the selector 72 selects the delayed signal to supply the same to the simple suppressor 62 as the selector output signal when the discrimination signal indicates the Rayleigh distribution. Under the circumstances, the simple suppressor 62 produces the second clutter suppressed signal. The simple suppressor 62 is thus shared by the first and the second suppressors 46 and 47 in common.

When the level monitor 71B is used as the discriminating device 71, the selector 72 selects the first and the second clutter suppressed signals with an appreciable delay particularly when coupled to the first and the second supressors 46 and 47 in the manner described with reference to FIG. 6. The delayed operation of the selector 72 is, however, immaterial.

Figure 7:
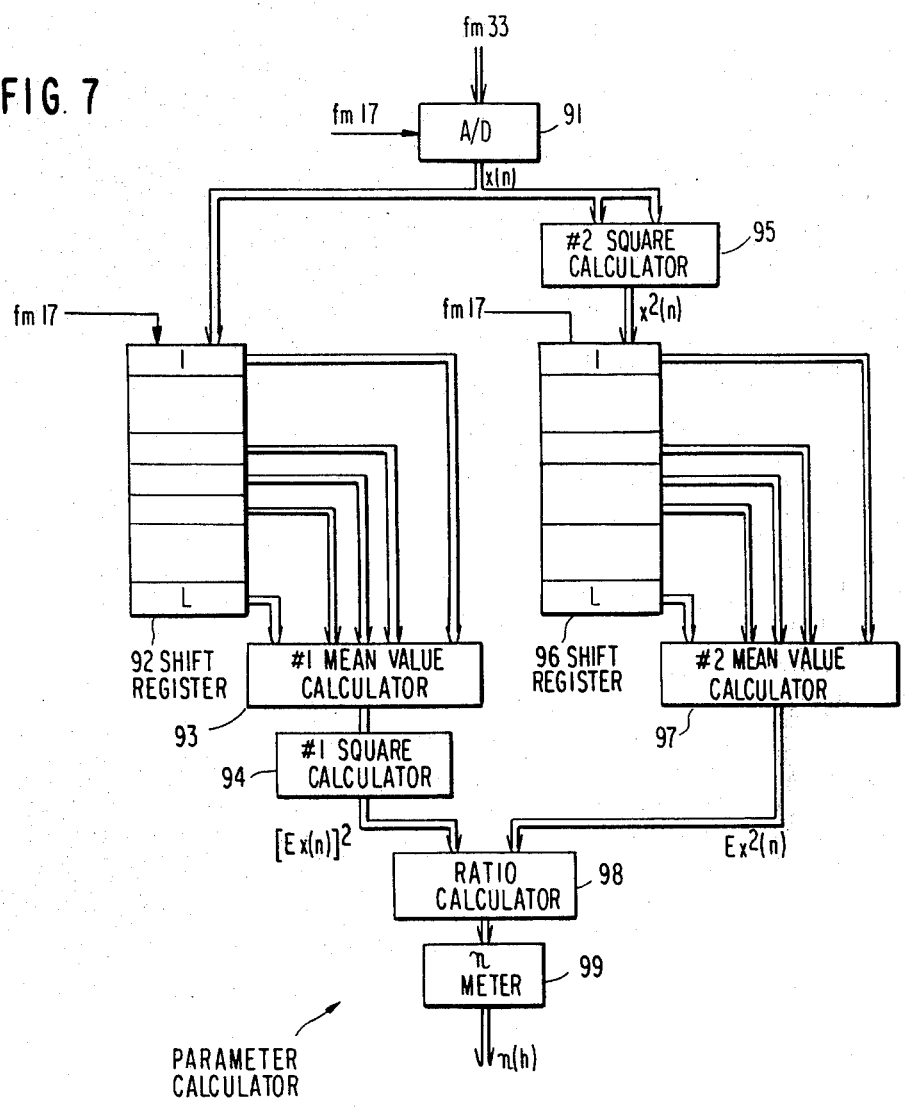
FIG. 7 is a block diagram of a parameter calculator that may be used in place of the parameter calculator illustrated in any of FIGS. 2, 3, and 6.

Finally referring to FIG. 7, a parameter calculator shown therein may be substituted for the parameter calculator 48 described in conjunction with FIG. 2 and consequently for each of those depicted in FIGS. 3 and 6. The illustrated parameter calculator is supplied with the detected signal rather than with the digital signal sequence and is operable as follows when only the clutter component amplitude x is taken into consideration. It is known in mathematics that a mean value $E(x)$ of the clutter component amplitude x and a square mean value $E(x^2)$ thereof are given by:

$$E(x) = \int_0^x xP_W(x)dx = \sigma \cdot \Gamma(1 + 1/\eta)$$

and $$E(x^2) = \int_0^x x^2 P_W(x)dx = \sigma^2 \cdot \Gamma(1 + 2/\eta),$$

respectively. Therefore, a ratio calculated according to:

$$[E(x)]^2/E(x^2) = [\Gamma(1 + 1/\eta)]^2/\Gamma(1 + 2/\eta), \tag{11}$$

or $$E(x)/\sqrt{E(x^2)} = \Gamma(1 + 1/\eta)/\sqrt{\Gamma(1 + 2/\eta)}, \tag{12}$$

is dependent only on the second parameter $\eta$.

In FIG. 7, an analog-to-digital converter 91 converts the detected signal to a sequence of digitized signals having digitized discrete amplitudes $x(n)$ of the envelope. A first cell averaging circuit comprises a first shift register 92 having first through L-th stages for storing the digitized signals, L in number at a time, and a first average calculator 93 for producing a first mean value signal representative of a first mean value $Ex(n)$ of the digitized amplitudes of the digitized signals stored in the first shift register 92 at a time. The number L may be selected between about twenty and thirty. It is now unnecessary to exclude one of the digitized signals that is stored in a prescribed stage. A first squaring circuit 94 is for producing a first squared signal representative of a square of the first mean value $[Ex(n)]^2$. Responsive directly to the digitized signal sequence, a second squaring circuit 95 produces a sequence of second squared signals representative of squares of the respective digitized amplitudes $x^2(n)$. A second cell averaging circuit comprises a second shift register 96 having first through L-th stages for the second squared signals, L in number at a time, and a second average calculator 97 for producing a second mean value signal representative of a second mean value $Ex^2(n)$ of the digitized amplitude squares, L in number at a time. A ratio calculator 98 produces a ratio signal representative of a ratio $[Ex(n)]^2/Ex^2(n)$. A parameter meter 99 produces the parameter signal representative of the second parameter value calculated by the use of Equation (11). The parameter meter 99 may be a read-only memory to which the ratio signal is supplied as an access signal. It is possible to refer to Equation (12) or to an inverse ratio on producing the parameter signal.

While two preferred embodiments of this invention have thus far been described together with various modifications thereof, it is now obvious that this invention can be carried into effect in a number of other ways. For example, it is possible to supply, instead of the logarithmic converter output signal, the output signal of the MTI canceller 45 to the first and the second suppressors 46 and 47 and the parameter calculator 48 through a logarithmic converter, such as that shown at 41 in each of FIGS. 1 and 4. In this connection, it is convenient to deem that a first and a second clutter suppressor and a parameter calculator comprise a logarithmic and analog-to-digital converter, such as depicted at 41 and 42 or 43, 44, and 41. The first shift register 51 or 92 may have a somewhat greater number of stages than the second shift register 54 or 96. The particular one of the signals stored in each of the first and the second shift registers 51 and 54 may be produced from any one of the stages provided that such particular signals are simultaneously produced from the respective shift registers. This applies to the third shift register 68 and the corresponding shift register comprised by the second suppressor separately from the third shift register 68. The numbers of the first, the second, and the third shift register stages may therefore be designated by A, B, and C with the particular or specific stages called an a-th, a b-th, and a c-th stage, respectively. The number of stages of the first and the second shift registers 92 and 96 of the parameter calculator illustrated with reference to FIG. 7 may be denoted by D and E. The level monitor 71B may be connected to the outputs of the first and the second suppressors 46 and 47 or to the simple suppressor 62 described in connection with FIG. 7. In this event, the intermediate processor may be a mere connection. When the discriminator 71A is used as the discriminating device with the novel processor resorted to, it is possible to put the gate circuit 50 into operation with a delay related to the number of third shift register stages preceding the zeroth stage 68(0).

What is claimed is:

1. In a moving target indication radar for use at least in detecting a moving target that is present in a predetermined space together with spurious objects, comprising a transmitter and a receiver for use in combination with an antenna device, said transmitter being for generating a sequence of microwave pulses of a predetermined pulse width and a predetermined repetition frequency, said antenna device being for making a beam of the microwave pulses scan said predetermined space along a plurality of unit azimuth regions and for receiving a return signal from each unit azimuth region, said return signal being capable of comprising a target return and clutter produced by said target and said spurious objects in response to one of the microwave pulses of said beam, respectively, said clutter having a clutter amplitude that follows one of Weibull and Rayleigh distributions at a time, said Weibull distribution being given by a probability density function of said clutter amplitude by the use of a first and a second parameter having values variable with time, said Rayleigh distribution being given by another probability density function of said clutter amplitude by the use of said first parameter alone with said second parameter given an invariant value equal to two, said receiver comprising means responsive to said return signal for producing a detected signal and a signal processor for processing said detected signal into a processed signal for use at least in detecting said target, said detected signal having an envelope, said envelope having an envelope amplitude variable with time in response to a target return component and a clutter component introduced into said envelope amplitude from said target return and said clutter, respectively, the improvement wherein said signal processor comprises:

parameter calculating means responsive to said detected signal for calculating the value of said second parameter to produce a parameter signal representative of the calculated second parameter value;

first suppressing means operatively coupled to said parameter calculating means and responsive to said detected signal for suppressing that first-kind component of said clutter component by the use of said parameter signal, which is introduced into said envelope amplitude from the clutter having a clutter amplitude following said Weibull distribution, to produce a first clutter suppressed signal having an amplitude that is kept below a first predetermined level unless at least one of said target return component and that second-kind component of said clutter component, which is introduced into said envelope amplitude from the clutter having a clutter amplitude following said Rayleigh distribution, is present in said envelope amplitude;

second suppressing means operatively coupled to said first suppressing means and responsive to said detected signal for suppressing said second-kind component to produce a second clutter suppressed signal having an amplitude that is kept below a second predetermined level unless at least one of said target return component and said first-kind component is present in said envelope amplitude;

discriminating means responsive to a variable input signal variable in compliance with that one of said Weibull and said Rayleigh distributions, which said clutter amplitude follows at each instant, for discriminating said one distribution from the other to produce a discrimination signal at a particular instant a predetermined interval of time after said each instant, said discrimination signal being indicative of said Weibull and said Rayleigh distributions when said Weibull and said Rayleigh distributions are discriminated to be followed by said clutter amplitude, respectively;

selecting means coupled to said first and said second suppressing means and responsive to said discrimination signal for selecting said first and said second clutter suppressed signals when said discrimination signal indicates said Weibull and said Rayleigh distributions, respectively, said selecting means thereby producing a selected signal having an amplitude that is kept below a first preselected level when said first clutter suppressed signal is selected and furthermore unless at least one of said target return component and said second-kind component is present in said envelope amplitude and below a second preselected level when said second clutter suppressed signal is selected and furthermore unless at least one of said target return component and said first-kind component is present in said envelope amplitude;

a connection between said discriminating means and a predetermined one of said parameter calculating means and said selecting means for supplying said discriminating means with one of said parameter signal and said selected signal as said variable input signal that is produced by the predetermined one of said parameter calculating means and said selecting means; and final processing means responsive to said discrimination signal for processing said selected signal into said processed signal.

2. A moving target indication radar as claimed in claim 1, wherein said selecting means comprises:

a selector connected to said discriminating means and said first and said second suppressing means for producing said first and said second clutter suppressed signals as a selector output signal when said discrimination signal indicates said Weibull and said Rayleigh distributions, respectively; and intermediate processing means connected to said selector for processing said selector output signal into said selected signal.

3. A moving target indication radar as claimed in claim 2, wherein said first suppressing means comprises:

first processing means operatively coupled to said parameter calculating means and responsive to said detected signal for processing said first-kind component by the use of said parameter signal into a clutter transform to produce a transform signal comprising said clutter transform, said clutter transform being what would be introduced into said transform signal through said envelope amplitude from imaginational clutter if said imaginational clutter were substituted for the clutter from which said first-kind component is introduced into said envelope amplitude, said imaginational clutter having a clutter amplitude that follows said Rayleigh distribution; and a suppressor responsive to said transform signal and connected to said selector for suppressing said clutter transform to produce said first clutter suppressed signal and to deliver the same to said selector.

4. A moving target indication radar as claimed in claims 2 or 3, wherein said predetermined one of the parameter calculating means and the selecting means is said selecting means;

said discriminating means comprising a level monitor connected to said intermediate processing means for monitoring said selected signal with reference to a prescribed level to make said discrimination signal indicate said Weibull and said Rayleigh distributions at said particular instant when the selected signals produced from said second and said first clutter suppressed signals through said selector output signal exceed said prescribed level during a prescribed interval of time immediately preceding said particular instant, respectively, said prescribed level being determined relative to said first and said second preselected levels.

5. A moving target indication radar as claimed in claim 1, wherein:

said first suppressing means comprises first processing means operatively coupled to said parameter calculating means and responsive to said detected signal for processing said target return component and said first-kind component into a target return transform and a clutter transform, respectively, to produce a transform signal comprising said target return transform with a predetermined delay relative to said target return component, said transform signal further comprising said clutter transform, said clutter transform being what would be introduced into said transform signal through said envelope amplitude from imaginational clutter of said Rayleigh distribution if said imaginational clutter were substituted for the clutter from which said first-kind component is introduced into said envelope amplitude;

said second suppressing means comprising second processing means operatively coupled to said first processing means and responsive to said detected signal for giving said predetermined delay to said target return component and said clutter component to produce a delayed signal comprising a target return delayed component and a clutter delayed component given said predetermined delay relative to said target return component and said clutter component, respectively;

said selecting means comprising a selector responsive to said discrimination signal, said transform signal, and said delayed signal for producing said transform and said delayed signals as a selector output signal when said discrimination signal indicates said Weibull and said Rayleigh distributions, respectively, said selector output signal comprising said target return transform together with said clutter transform and said target return delayed component together with said clutter delayed component when said transform and said delayed signals are produced as said selector output signal, respectively;

said first and said second suppressing means further comprising a suppressor in common, said suppressor being responsive to said selector output signal for suppressing one of said clutter transform and said clutter delayed component that is comprised by said selector output signal to produce said first and said second clutter suppressed signals when said transform and said delayed signals are produced as said selector output signal, respectively;

said selecting means further comprising intermediate processing means connected to said suppressor for processing said first and said second clutter suppressed signals into said selected signal when said transform and said delayed signals are produced as said selector output signal, respectively.

6. A moving target indication radar as claimed in claim 5, wherein said predetermined one of the parameter calculating means and the selecting means is said parameter calculating means.

7. A moving target indication radar as claimed in claim 5, wherein said predetermined one of the parameter calculating means and the selecting means is said selecting means;

said discriminating means comprising a level monitor connected to said intermediate processing means for monitoring said selected signal with reference to a prescribed level to make said discrimination signal indicate said Weibull and said Rayleigh distributions at said particular instant when the selected signals produced from said first and said second clutter suppressed signals through said selector output signal exceed said prescribed level during a prescribed interval of time immediately preceding said particular instant, respectively, said prescribed level being determined relative to said first and said second preselected levels.

8. A moving target indication radar as claimed in claims 5, 6, or 7, wherein:

said first and said second processing means comprise, in common:

logarithmic and analog-to-digital conversion means for converting said detected signal to a sequence of digital signals indicative of logarithms of digitized discrete amplitudes of said envelope; and a first shift register having a first through an A-th stage including an a-th stage (A and a being representative of a predetermined integer and a predetermined one of 1 through A, respectively) for storing the digital signals, A in number at a time, said a-th stage storing a particular digital signal among the digital signals stored in said first shift register at a first specific instant, a sequence of such particular digital signals providing said delayed signal, each of said target return delayed component and said clutter delayed component being provided by a particular digital signal of said particular digital signal sequence;

said first processing means further comprising:

a first average calculator responsive to the digital signals stored in the first shift register stages except said a-th stage, respectively, for producing a first average signal at said first specific instant, said first average signal being representative of a first average equal to the mean value of the logarithms indicated by the last-mentioned digital signals;

a square calculator responsive to said digital signal sequence for producing a sequence of squared signals representative of squares of the respective logarithms indicated by the successive digital signals;

a second shift register having a first through a B-th stage including a b-th stage (B being representative of a preselected integer) for storing the squared signals, B in number at a time, said b-th stage being for storing a particular squared signal among the squared signals stored in said second shift register at said first specific instant, said particular squared signal being representative of the square of the logarithm indicated by the particular digital signal stored in said first shift register a-th stage at said first specific instant;

a second average calculator responsive to the squared signals stored in the second shift register stages except said b-th stage, respectively, for producing a second average signal at said first specific instant, said second average signal being representative of a second average equal to the mean value of the squares represented by the last-mentioned squared signals;

a parameter logarithm calculator responsive to said first average signal and the parameter signal produced at said first specific instant for calculating a logarithm of said first parameter to produce a parameter logarithm signal representative of the calculated first parameter logarithm at said first specific instant;

a first subtractor responsive to the particular digital signal stored in said first shift register a-th stage at said first specific instant and to said parameter logarithm signal for producing a first difference signal representative of a first difference resulting from subtraction of said calculated first parameter logariths from the logarithm indicated by the last-mentioned particular digital signal;

a multiplier responsive to the last-mentioned parameter signal and said first difference signal for producing a product signal representative of a product of the calculated second parameter value represented by the last-mentioned parameter signal, said first difference, and ½; and an adder responsive to said product signal and said parameter logarithm signal for producing a digital sum signal indicative of a sum of said product and said calculated first parameter logarithm, a sequence of such digital sum signals providing said transform signal, each of said target return transform and said clutter transform being provided by a digital sum signal of said digital sum signal sequence;

said suppressor comprising:

a third shift register having a first through a C-th stage including a c-th stage (C and c being representative of a prescribed integer and a prescribed one of 1 through C, respectively) for storing the digital sum signals, C in number at a time, and the particular digital signals of said particular digital signal sequence, again C in number at a time, when said transform and said delayed signals are produced as said selector output signal, respectively, said c-th stage storing a specific signal among the signals stored in said third shift register at a second specific instant a preselected interval of time after said first specific instant;

a third average calculator responsive to the signals stored in the third shift register stages except said c-th stage, respectively, for producing a third average signal at said second specific instant, said third average signal being representative of a third average equal to the mean value of the sums indicated by the digital sum signals and of the logarithm indicated by the particular digital signals when said transform and said delayed signals are produced as said selector output signal, respectively, either of the last-mentioned digital sum signals and the last-mentioned particular digital signals being the signals stored in said third shift register stages except said c-th stage at said second specific instant, respectively;

a second subtractor responsive to said specific signal and said third average signal for producing a second difference signal representative of a second difference obtained by subtracting said third average from the sum and the logarithm indicated by said specific signal when said specific signal is one among the digital sum signals of said digital sum signal sequence and among the particular digital signals of said particular digital signal sequence, respectively, a sequence of such second difference signals providing said first and said second clutter suppressed signals when said transform and said delayed signals are produced as said selector output signal, respectively, the second differences of the last-mentioned second difference signals providing discrete amplitudes of said first and said second clutter suppressed signals when said transform and said delayed signals are produced as said selector output signal, respectively;

said intermediate processing means comprising an antilogarithmic converter connected to said suppressor for producing an antilogarithmic converter output signal as said selected signal, said antilogarithmic converter output signal having discrete amplitudes related to antilogarithms of the discrete amplitudes of said first clutter suppressed signal and to antilogarithms of the discrete amplitudes of said second clutter suppressed signal when said transform and said delayed signals are produced as said selector output signal, respectively;

said final processing means comprising:

a threshold setting circuit responsive to said discrimination signal for producing a variable threshold signal having a first and a second threshold level at a third specific instant, said first and said second threshold levels being related to antilogarithms of said first and said second predetermined levels when said discrimination signal indicates said Weibull and said Rayleigh distributions, respectively, said third specific instant being said preselected interval after said particular instant and being said particular instant when said predetermined one of the parameter calculating means and the selecting means is said parameter calculating means and said selecting means, respectively; and a gating circuit responsive to said threshold signal for producing those portions of said antilogarithmic converter output signal as said processed signal which have discrete amplitudes higher than said first and said second threshold levels when said threshold signal has said first and said second threshold levels, respectively.

9. A moving target indication radar as claimed in claim 8, wherein said parameter calculating means:

shares said logarithmic and analog-to-digital conversion means, said first shift register, said first average calculator, said square calculator, said second shift register, and said second average calculator with said first processing means; and comprises a parameter calculator responsive to said first and said second average signals for calculating said second parameter value to produce said parameter signal.

10. A moving target indication radar as claimed in claim 8, wherein said parameter calculating means comprises:

analog-to-digital conversion means for converting said detected signal to a sequence of digitized signals having digitized discrete amplitudes of said envelope;

a first cell averaging circuit responsive to said digitized signal sequence for producing a first mean value signal representative of a first mean value equal to the mean value of the digitized discrete amplitudes of the successive digitized signals, D in number at a time, where D represents a first prescribed integer;

a first squaring circuit responsive to said first mean value signal for producing a first squared signal representative of a square of said first means value;

a second squaring circuit responsive to said digitized signal sequence for producing a sequence of second squared signals representative of squares of the respective discrete amplitudes of the successive digitized signals;

a second cell averaging circuit responsive to said second squared signal sequence for producing a second mean value signal representative of a second mean value equal to the mean value of the discrete amplitude squares represented by the successive second squared signals, E in number at a time, where E represents a second prescribed integer;

a ratio calculator responsive to said first squared signal and the simultaneously produced second mean value signal for producing a ratio signal representative of a ratio related to a quotient resulting from division of said first mean value by the second mean value represented by said simultaneously produced second mean value signal; and a parameter calculator responsive to said ratio signal for calculating said second parameter value with reference to said ratio to produce said parameter signal.

11. A moving target indication radar as claimed in claim 8 dependent from claim 7, wherein said level monitor comprises:

a first comparator responsive to said antilogarithmic converter output signal for producing a sequence of discrete output signals, each of which is given a predetermined one of binary levels and the other at each of instants at which the discrete amplitudes of said antilogarithmic converter output signal is rendered higher and not higher than said prescribed level, respectively;

a counter for counting those of the discrete output signals, each of which has said predetermined binary level, to produce a count signal representative of a count of those last-mentioned discrete output signals which are supplied thereto during said prescribed interval;

a second comparator responsive to said count signal for producing a comparator output signal that is given a preselected one of binary values and the other when the count is greater and not greater than a prescribed count, respectively;

an Exclusive OR circuit having a first and a second input terminal for receiving said comparator output signal and a binary input signal having either of the binary values at a time, respectively, to produce an Exclusive OR'ed signal having an output binary value that is the same as the Exclusive OR of the comparator output signal binary value and the binary input signal binary value;

a register responsive to said Exclusive OR'ed signal for registering the output binary value to produce a register output signal having a registered binary value that is the same as the output binary value registered therein; and means are supplying said register output signal to the Exclusive OR circuit second input terminal as said binary input signal, said register output signal thereby providing said discrimination signal with said Weibull and said Rayleigh distributions indicated thereby changed from one to the other when said registered binary value is switched from one of the binary values to the other.

* * * * *

UNITED STATES PATENT AND TRADEMARK OFFICE
CERTIFICATE OF CORRECTION

PATENT NO. : 4,318,101
DATED : March 2, 1982
INVENTOR(S) : Toshimitsu MUSHA et al.

It is certified that error appears in the above—identified patent and that said Letters Patent is hereby corrected as shown below:

Column 2, line 43, delete "($P_w$" and insert -- $P_w$ -- ;

line 59, delete "promissing" and insert -- promising -- ;

line 64, delete "roneoulsly" and insert -- roneously -- .

Column 6, line 50, delete "$f_2$" and insert -- $f_s$ -- ;

line 60, delete "cosideration" and insert -- consideration -- .

Column 8, line 64, delete "(w" and insert -- w -- .

Column 9, line 61, delete "in" (first occurrence) and insert -- is -- .

Column 10, in the equation between lines 50-55, delete " $\substack{x \\ 0}$ " and insert -- $\int_0^x$ -- ;

line 60, delete "z-=log" and insert -- z=-log -- .

UNITED STATES PATENT AND TRADEMARK OFFICE
CERTIFICATE OF CORRECTION

PATENT NO. : 4,318,101

DATED : March 2, 1982

INVENTOR(S) : Toshimitsu MUSHA et al.

It is certified that error appears in the above—identified patent and that said Letters Patent is hereby corrected as shown below:

Column 12, line 16, delete "Representative" and insert -- Responsive -- .

Column 14, line 51, delete "accomparied" and insert -- accompanied -- .

Column 16, line 26, delete "supressors" and insert -- suppressors -- ;

in the equation between lines 40 and 45, delete " $x \atop 0$ " and insert -- $\int_0^x$ -- ;

in the equation between lines 45 and 50, delete " $x \atop 0$ " and insert -- $\int_0^x$ -- .

UNITED STATES PATENT AND TRADEMARK OFFICE
CERTIFICATE OF CORRECTION

PATENT NO. : 4,318,101

DATED : March 2, 1982

INVENTOR(S) : Toshimitsu MUSHA et al.

It is certified that error appears in the above—identified patent and that said Letters Patent is hereby corrected as shown below:

Column 25, line 3, delete "are" and insert -- for -- .

Signed and Sealed this

Twenty-ninth Day of June 1982

[SEAL]

Attest:

GERALD J. MOSSINGHOFF

Attesting Officer

Commissioner of Patents and Trademarks